US006498440B2

(12) United States Patent
Stam et al.

(10) Patent No.: US 6,498,440 B2
(45) Date of Patent: Dec. 24, 2002

(54) LAMP ASSEMBLY INCORPORATING OPTICAL FEEDBACK

(75) Inventors: Joseph S. Stam, Holland, MI (US); John K. Roberts, East Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/818,958

(22) Filed: Mar. 27, 2001

(65) Prior Publication Data

US 2002/0047624 A1 Apr. 25, 2002

Related U.S. Application Data

(60) Provisional application No. 60/192,484, filed on Mar. 27, 2000.

(51) Int. Cl.[7] ........................ H05B 37/02; G05B 37/00; G05F 1/00

(52) U.S. Cl. .......................... 315/291; 315/316; 11/292

(58) Field of Search ................................ 315/291, 316, 315/318, 292, 295, 362, 309, 293, 317; 340/825.07, 825.18, 815.45; 362/800

(56) References Cited

U.S. PATENT DOCUMENTS 4,992,704 A 2/1991 Stinson ...................... 315/312
5,350,977 A * 9/1994 Hamamoto et al. ......... 315/291
5,420,482 A 5/1995 Phares ........................ 315/292
6,016,038 A * 1/2000 Mueller et al. ............. 315/291
6,166,496 A * 12/2000 Lys et al. ................... 315/292
6,285,140 B1 * 9/2001 Ruxton ....................... 315/291

* cited by examiner

*Primary Examiner*—Don Wong
*Assistant Examiner*—Chuc Tran
(74) *Attorney, Agent, or Firm*—Price, Heneveld, Cooper, DeWitt & Litton; James E. Shultz Jr.

(57) ABSTRACT

An illuminator assembly that is capable of utilizing a plurality of light sources to produce a desired resultant hue, includes a processor, a memory, a plurality of light sources and a detector. The memory is coupled to the processor and stores data and information. Each of the plurality of light sources are coupled to the processor and produce a different color. The processor is capable of independently controlling the intensity of each light source so as to produce a desired resultant hue. The detector is also coupled to the processor. The detector provides the processor with information which the processor utilizes in determining how to adjust the intensity of each of the light sources to provide the desired resultant hue.

19 Claims, 7 Drawing Sheets

LAMP ASSEMBLY INCORPORATING OPTICAL FEEDBACK

This application claims priority based on U.S. Provisional Patent Application Ser. No. 60/192,484, entitled "LAMP ASSEMBLY INCORPORATING OPTICAL FEEDBACK," by Joseph S. Stam et al., filed Mar. 27, 2000, the disclosure of which is hereby incorporated by reference.

BACKGROUND OF THE INVENTION

The present invention is directed to a lamp assembly and, more specifically, to a lamp assembly that incorporates optical feedback.

Recent advances in light emitting diode (LED) technology has led to the development of several high-brightness LED lamps for use in automobiles and other applications. Many of these applications require a substantially white colored illumination when providing light for tasks such as, for example, reading a map or book. A common method of producing white light using LEDs is to deposit a yellow phosphor on top of a InGaN Blue LED die. Some of the blue light emitted by the LED is absorbed by the phosphor causing it to emit yellow light. The combination of the blue light from the LED and the yellow light from the phosphor combines to produce a metameric white light.

This technique is relatively simple and leads to a single component solution. However, this technique relies entirely on an InGaN emitter as the source of energy for the illuminator. Currently, most InGaN LED systems are less efficient and more expensive than other alternatives, such as AlInGaP LED emitters. As such, a system that relies primarily on an InGaN die, as the source of optical radiation, is typically more expensive to produce. Additionally, the use of a phosphor typically shortens the useful life of the device as an illuminator. This is because the phosphor typically decays at a faster rate than the underlying InGaN die. Additionally, as the phosphor decays, the relative proportion of yellow light emitted is reduced, which results in a color shift in the light output.

Another technique for producing white light is to combine the outputs of an amber AlInGaP LED and a blue-green InGaN LED in appropriate proportions. Such an approach is outlined in U.S. Pat. No. 5,803,579 entitled, ILLUMINATOR ASSEMBLY INCORPORATING LIGHT EMITTING DIODES, to Turnbull, et. al., commonly assigned with the present invention, and hereby incorporated by reference. Using this approach, the outputs of the LEDs are combined in different proportions to produce white light of different color temperatures. An increase in the proportion of amber light (or a corresponding decrease in the proportion of blue-green light) will produce a warmer white light corresponding to a lower color temperature. An increase in the proportion of blue-green light produces a cooler white light corresponding to a higher color temperature.

Although the two types of LED dies decay at a rate that is more similar than the rates of InGaN die and phosphors, the AlInGaP and InGaN dies still exhibit a difference in decay rates. These differences in decay rates lead to a difference in color temperature over the life of the device. However, since a change in relative proportion of one of the constituent colors still produces a resultant color, which is typically accepted as white light, the severity of this effect is acceptable in many applications. Unfortunately, this effect is typically increased due to the wide variance in intensity and somewhat lesser variance in color that is typical of modern LED production. In order to accommodate for intensity and color variance, one must measure the output of the blue-green and amber LEDs and adjust their initial proportions during assembly of the lamp.

Yet another method of creating white light using LEDs is to combine the colors of three or more LEDs in a particular ratio to form white light. A typical system may combine light from red, blue and green LEDs to form an RGB system that is capable of producing not only white light but any other color of light as well (by adjusting the intensity of the red, blue and green LEDs, independently). Another advantage of such a system is the potential for an improved color rendering index and thus an increase in the brilliance of colors on the object being illuminated. The primary difficulty in implementing an illuminator using a plurality of LEDs, especially where there are three or more colors, is accommodating the large intensity variance present in modern LEDs. The high variance in intensity of the individual color LEDs leads to wide variance in the output color. To solve this problem, LEDs are typically sorted by color and intensity. Frequently, further measurements of individual assemblies are needed to insure accurate color calibration. These methods may partially correct an initial problem but do not solve problems associated with differential brightness decay, which occurs with aging or changes in intensity of the individual constituent colors which can occur with changes in temperature of the die or the ambient environment.

As such, an illuminator assembly that adapts to light source component variability, to produce a desired resultant hue of illumination, is desirable.

SUMMARY OF THE INVENTION

An embodiment of the present invention is directed to an illuminator assembly that produces light of a desired resultant hue. In one embodiment, the illuminator assembly includes a processor, a memory, a plurality of light sources and a detector. The memory is coupled to the processor and stores data and information. Each of the plurality of light sources are coupled to the processor and produce a different primary color. The processor is capable of independently controlling the intensity of each light source so as to produce a desired hue resulting from the mixing of the light emitted from each light source. The detector is also coupled to the processor. The detector provides the processor with information, which the processor utilizes in determining how to adjust the intensity of each of the light sources to provide the desired resultant hue.

These and other features, advantages and objects of the present invention will be further understood and appreciated by those skilled in the art by reference to the following specification, claims and appended drawings.

DETAILED DESCRIPTION OF THE PREFERRED EMBODIMENTS

The present invention is directed to a lamp (e.g., LED) assembly that utilizes a detector (to provide optical feedback), preferably located within the LED assembly, to determine how to adjust drive currents provided to a plurality of LEDs that are grouped according to color. The detector is preferably positioned such that it can receive light radiated from each LED group. A control circuit receives input from the detector and based on the input, adjusts the drive current of each group of LEDs to produce a desired resultant hue. The control circuit can also adjust the intensity of the entire assembly. In addition, the control circuit is preferably capable of determining an ambient light level, which can be utilized in determining the actual light output of an LED group.

Figure 1:
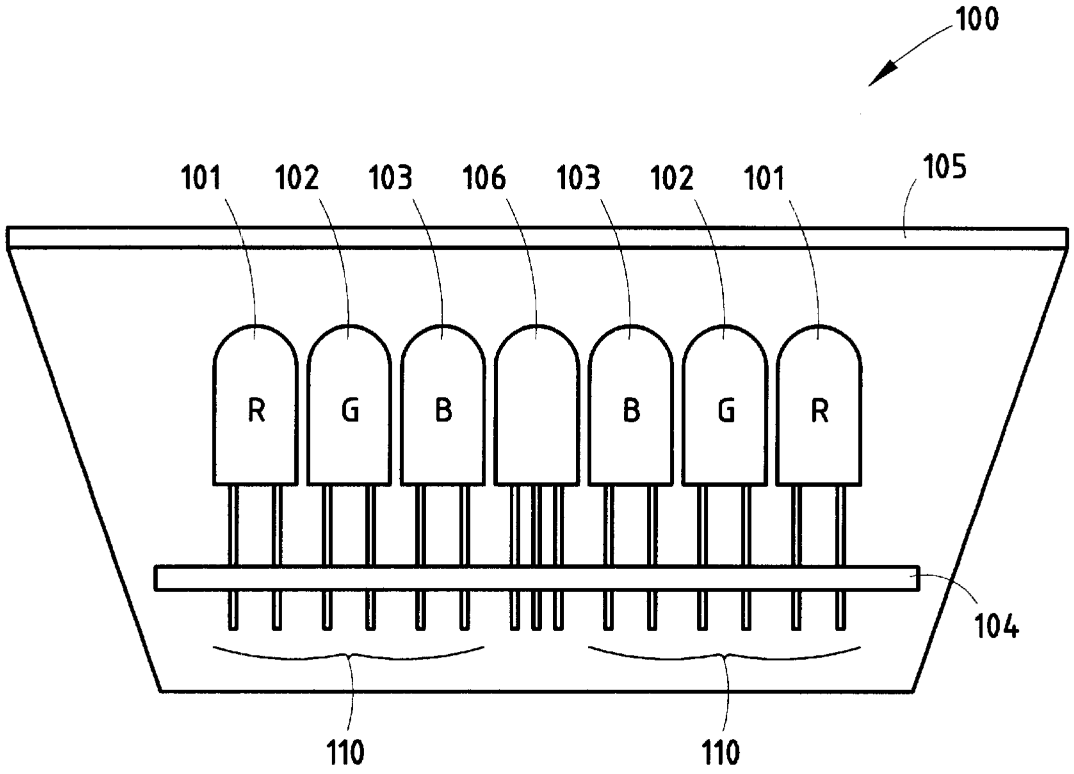
FIG. 1 is a drawing of an illuminator assembly constructed, according to an embodiment of the present invention.

FIG. 1 depicts a lamp assembly 100 that includes a plurality of light emitting diodes (LEDs) 110, according to an embodiment of the present invention. Each LED may be of a unique color, there may be several LEDs of one color or there may be multiple groups of LEDs, each group being a unique color. FIG. 1 shows three groups of LEDs 110 with each group containing two LEDs (two red LEDs 101, two green LEDs 102 and two blue LEDs 103). By independently controlling the intensity of each of these groups, any color illumination (including white light) can be produced. The use of three colors or the colors specifically mentioned herein are merely exemplary and are not intended to be limiting.

LEDs 110 may be of a variety of types. The LEDs 110 may contain solid state semiconductor radiation emitters that have at least one PN junction (in which photons are emitted upon the passage of current through the junction). The solid state semiconductor radiation emitter may be referred to hereinafter as an LED chip, an LED die or an emitter. Such LED chips may be composed of materials such as InGaN, AlInGaP, GaP, GaN, GaAs, AlGaAs, SiC or others. LED chips of this type are available from such companies as LumiLEDs, Cree, Uniroyal Technology Corporation, Nichia, Toyoda Gosai, Tyntec and others. The LED chip may be packaged by a variety of means, including bonding of the chip onto a leadframe and encapsulating the leadframe and chip with a transparent encapsulant material. The leadframe may be designed for surface mount or thru-hole assembly onto a printed circuit board or may not be designed for circuit board assembly. Packages of this type are referred to by common names such as T-1, T-1¾, T-5, poly-LED, chip-LED, super-flux, piranha™, snap-LED and others. Alternatively, the LED chips need not be packaged at all and may be directly attached to a circuit board 104 using chip-on-board assembly techniques or the like. An LED die package using one of the above mentioned techniques may be referred to hereinafter as a light source, an LED device, an LED lamp or simply an LED. LED lamps are available from numerous companies such as LumiLEDs, Nichia, Stanley, Osram, Panasonic and Unity Optoelectronics, to name a few.

In a preferred embodiment LEDs 110 are constructed as described in U.S. patent application Ser. No. 09/426,795, filed Oct. 22, 1999, entitled SEMICONDUCTOR RADIATION EMITTER PACKAGE, to Roberts et al., commonly assigned with the present invention and hereby incorporated by reference. Alternatively, the LEDs may be constructed according to U.S. Provisional Patent Application Ser. No. (60/265,487 ) filed on Jan. 31, 2001, entitled HIGH POWER LED LIGHT ENGINE to Roberts et al.; U.S. Provisional Patent Application Ser. No. (60/265,489 ), filed on Jan. 31, 2001, entitled LIGHT EMITTING DIODES AND METHOD OF MAKING THE SAME to Roberts et al.; and U.S. Provisional Patent Application Ser. No. 60/27005 45 , filed on Feb. 19, 2001, entitled RADIATION EMITTER DEVICE HAVING A MICROGROOVE LENS to Roberts, commonly assigned with the present invention and hereby incorporated by reference. U.S. patent application Ser. No. 09/426,795 to Roberts et al. discloses an LED chip that is mounted onto a leadframe containing a heat extraction member and encapsulated with a transparent encapsulant. Roberts et al. also discloses an LED lamp which is configurable as a thru-hole or surface-mount device compatible with traditional electronic assembly methods. The presence of the heat extraction member allows the LED chips to be operated at greater currents by dissipating heat in a more efficient manner than is possible with conventional LED packages.

Figure 2A:
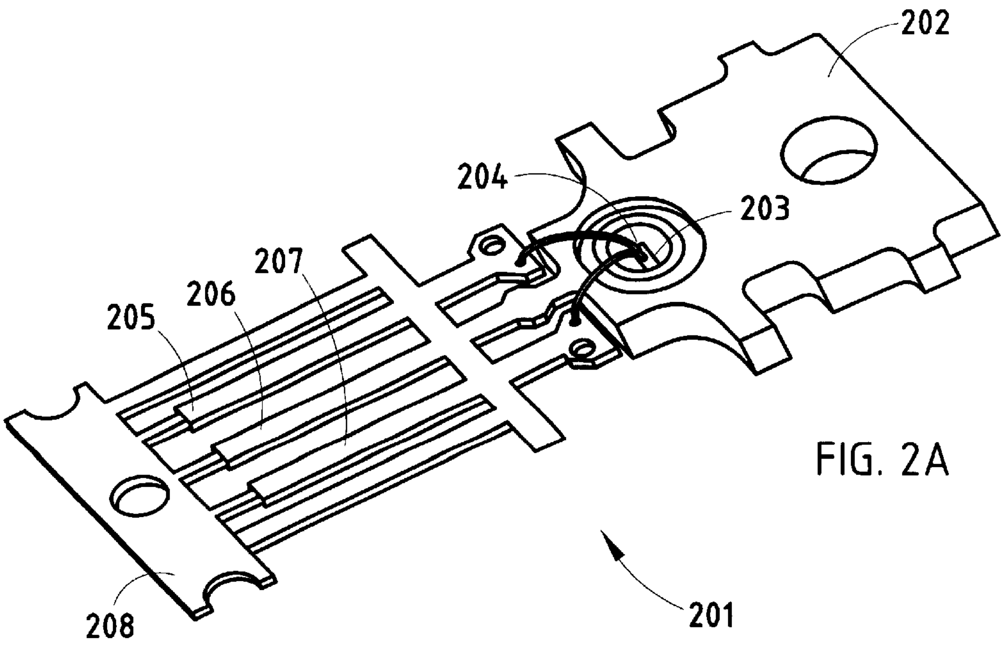
FIG. 2A shows a leadframe for an LED lamp, which may be used in conjunction with the present invention.
Figure 2B:
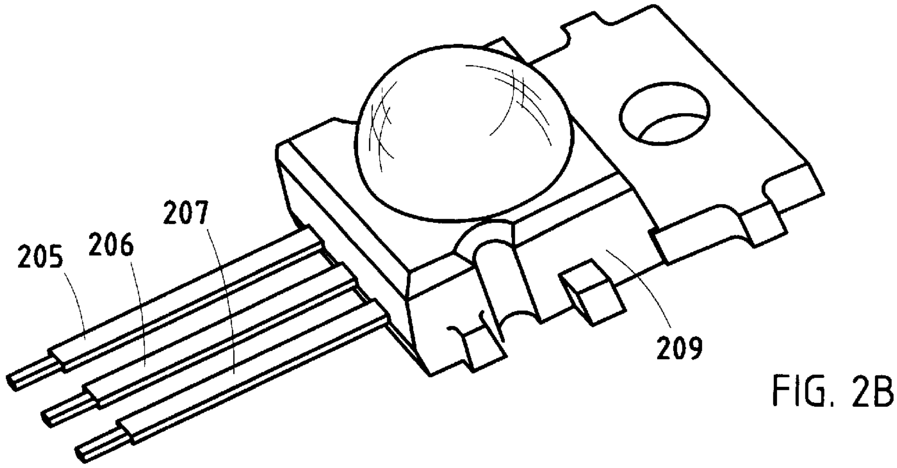
FIG. 2B shows an encapsulated LED lamp, which may be used in conjunction with the present invention.

Roberts et al. also discloses a plurality of LED chips that are incorporated into a single LED package that provides sufficient heat dissipation to operate the LED chips at a high enough current for illumination applications. FIG. 2A shows a thru-hole configuration of a Roberts et al. leadframe 201 prior to encapsulation. As shown, the leadframe 201 contains a heat extraction member 202 and two LED chips 203 and 204. LED chips may be of the same or different types or colors. The current to each of the LED chips can be controlled separately through electrical leads 205 and 207 with a common chip substrate connection provided by electrical lead 206. If LED chips 203 and 204 are of different colors, the resultant hue, which is synthesized by the combination of the two colors, can be dictated by varying the current to these two leads 205 and 207. FIG. 2B shows the leadframe 201 of FIG. 2A after it has been encapsulated with encapsulant 209, with tiebars 208 removed.

Figure 3A:
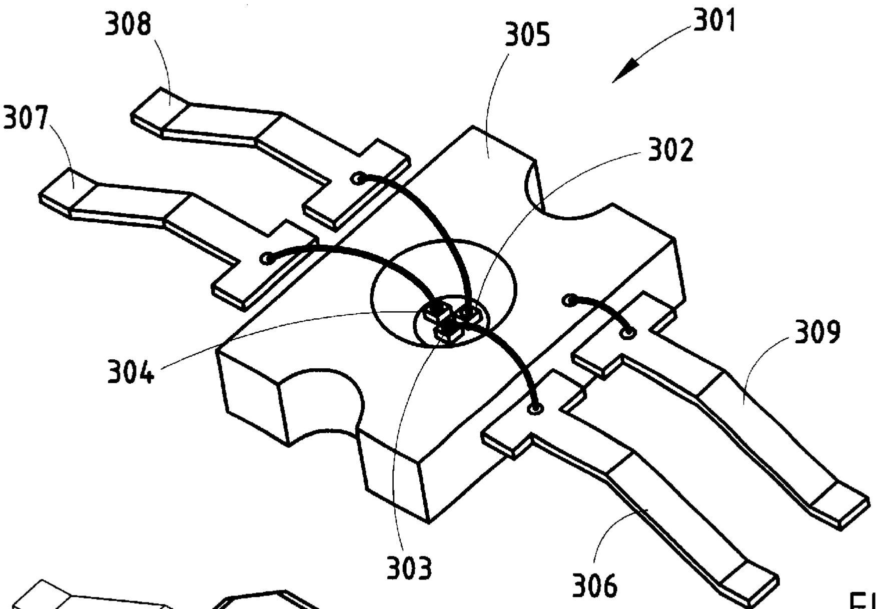
FIG. 3A shows another leadframe for an LED lamp, which may be used in conjunction with the present invention.
Figure 3B:
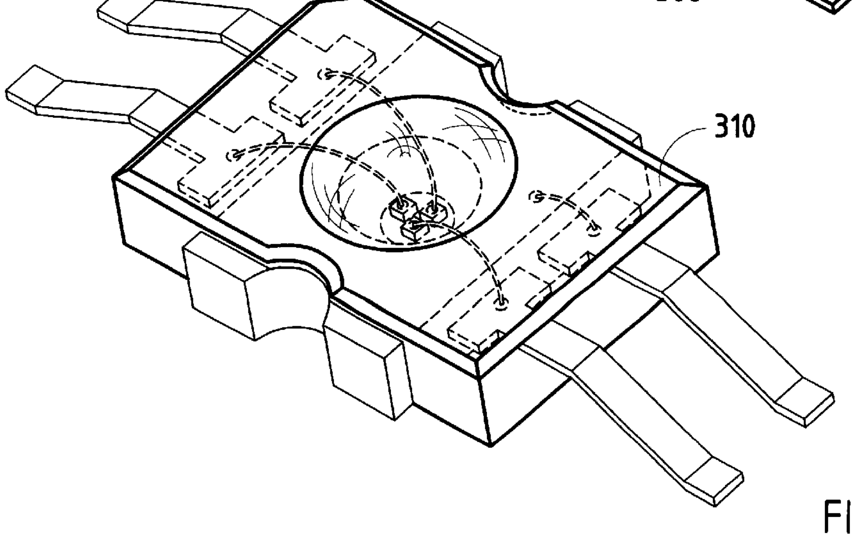
FIG. 3B shows another encapsulated LED lamp, which may be used in conjunction with the present invention.

Another configuration disclosed in Roberts et al. is shown in FIGS. 3A and 3B. FIG. 3A illustrates a surface mount configuration of a leadframe 301 with three emitters 302, 303 and 304 mounted onto a heat extraction member 305 and connected with electrical leads 306, 307 and 308 and a substrate electrical lead 309. FIG. 3B shows the device of FIG. 3A with encapsulation 310. As above, the three emitters 302, 303 and 304 may be of the same type or of different types and may be controlled independently. If the three emitters 302, 303 and 304 are red, green and blue, respectively, the device can produce light of any hue if the current to each of the emitters 302, 303 and 304 is changed independently.

In addition to solid state semiconductor optical radiation emitters, the present invention may be adapted equally to other types of semiconductor radiation emitters, such as polymer LEDs or organic LEDs (OLEDs). Additionally, the present invention should not be construed as limited to any particular configuration of LED chip or LED lamp or packaging technique. Nor should the present invention be construed as limited to any number of LED lamps or any number of LED lamp colors.

An optical radiation detector 106 is preferably configured to measure the optical radiation from any of LEDs 110 and is optionally configured to measure ambient lighting conditions. As shown in FIG. 1, light from LEDs 110 is radiated onto a diffuser 105. While most of the light from LEDs 110 passes through the diffuser 105 and onto the illuminated scene, some of the light is scattered from the diffuser 105 back towards detector 106 and thus allows detector 106 to measure the relative output of the LEDs 110. Additionally, the detector 106 can optionally measure the ambient light through diffuser 105.

Diffuser 105 may be constructed as a frosted piece of glass or plastic. Alternatively, diffuser 105 may be an engineered diffuser such as a Holographic Light Shaping Diffuser™, available from Physical Optics Corporation of Torrance, Calif. Such diffusers typically provide a controlled amount of diffusion and maximum efficiency. Detector 106 may be used to provide additional functionality to lamp 100. For example, detector 106 may be used as an optical receiver for communication of data or instructions from an optical transmitter, such as is common in IRDA systems. The instructions can be, for example, from an infrared remote control and may include commands such as to turn on/off lamp 100, vary the brightness of lamp 100 or vary the color of lamp 100. Instructions can also be communicated to other devices, which may be coupled to lamp 100 via a network. For example, multiple lamps 100 may be positioned throughout a house and networked together and may serve as receivers for infrared remote controls, which control other appliances such as a stereo or television set. In addition, LEDs 110 may be used to encode a response to a remote control or may be used to communicate data optically to other devices. Further, instructions may be communicated to lamp 100 by other techniques such as by radio frequency transmissions, using protocols such as BlueTooth™. Instructions may alternatively by communicated over a separate network or as a current line carrier signal.

The detector 106 may be of various types including silicon photodiodes or CdS photoresistors. In a preferred embodiment, the detector is constructed according to U.S. patent application Ser. No. 09/307,191, filed on May 7, 1999, entitled PHOTODIODE LIGHT SENSOR to Nixon et al., commonly assigned with the present invention and hereby incorporated by reference. The Nixon et al. detector collects light over a variable integration time and provides a digital output indicative of the amount of light collected. The Nixon et al. detector includes a direct digital connection to a microcontroller that is adaptable to operate over a wide range of light levels and is typically small and inexpensive. However, one of ordinary skill in the art will appreciate that the present invention can be implemented advantageously with a large variety of optical detectors, provided that a detector is capable of measuring the relative optical output of any of the LEDs.

In addition to the embodiment illustrated in FIG. 1, it is possible to configure detector 106 in multiple ways. The detector may be configured to directly view the output of one or more of the LEDs 110 either by mounting it separate from circuit board 104 or by optically redirecting light from any of LEDs 110 to the detector using light pipes or mirrors. Numerous optical configurations are possible so long as the detector 106 is capable of receiving at least a portion of radiation from any of LEDs 110, which it is intended to measure.

More than one detector 106 may be utilized. When multiple detectors 106 are utilized, they are typically configured to view different LEDs 110. A detector 106 may be configured with a filter which allows a single color of light from LEDs 101, 102 or 103 to be detected and thus greatly reduces the sensitivity of the detector 106 to light which is not emitted from the desired color of LED. In this case, another detector 106 may contain a filter, which allows light of another color of light to be detected.

In another embodiment, one of LEDs 101, 102 or 103 may actually be used as detector 106. For example, one of LEDs 101 can be reverse-biased and operated as a photodiode to detect light from other LEDs 101 of the same color.

Figure 4:
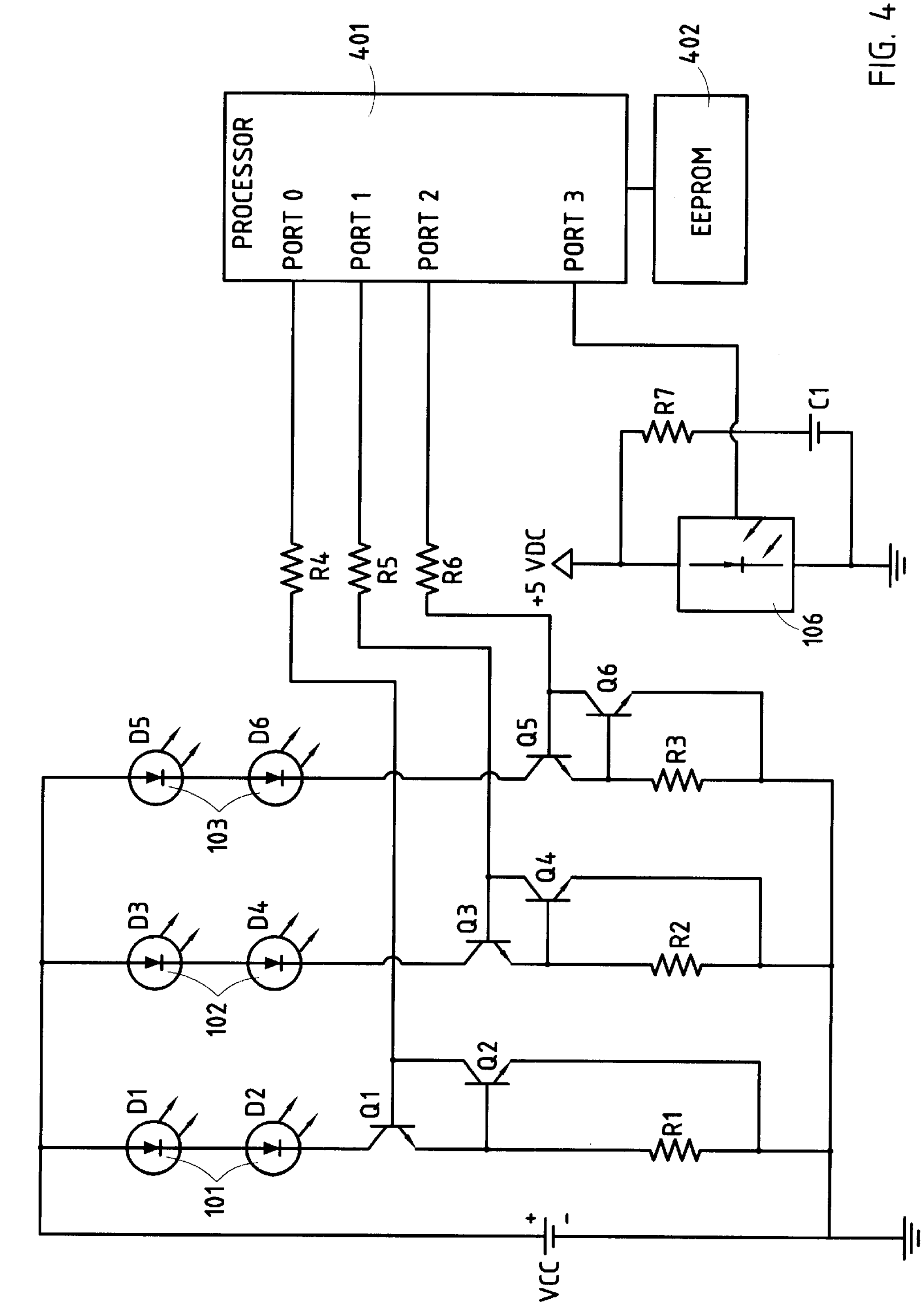
FIG. 4 shows a control circuit for implementing an embodiment of the present invention.

FIG. 4 shows a control circuit utilized in conjunction with illuminator assembly 100 that contains three groups of two LEDs, each group being of a different color. The LEDs are powered from a common supply labeled VCC. The LEDs in each set are driven independently by ports 0, 1 and 2 of processor 401 through transistors Q1 through Q6. In this context, the term processor may include a general purpose processor, a microcontroller (i.e., an execution unit with memory, etc., integrated within a single integrated circuit) or a digital signal processor. Transistors Q1, Q3 and Q5 may be of type MPSA06 and transistors Q2, Q4 and Q6 may be of type Q2N3904. Processor 401 may be of a variety of types, for example, one of a number of PIC microcontrollers available from Microchip of Chandler, Ariz.

The operation of this type of LED drive circuit is explained in detail in U.S. Pat. No. 5,803,579, previously incorporated. In summary, when port 0 of processor 401 is asserted, LEDs D1 and D2 are turned on. When port 1 is asserted, LEDs D3 and D4 are turned on. When port 2 is asserted, LEDs D5 and D6 are turned on. The current for each set of LEDs is limited by resistors R1, R2 and R3. By rapidly turning ports 0, 1 and/or 2 on and off at a rate faster than is perceivable to the human eye, it is possible to vary the apparent brightness of the LEDs. This technique is commonly referred to as pulse width modulation (PWM). The percentage of time that each LED group is on is the duty cycle of the LED group. The greater the duty cycle, the brighter the LEDs of a given LED group. In order to remain unperceivable to the human eye, the frequency at which the LEDs are pulse width modulated should be greater than 15 Hz, more preferably greater than 30 Hz and most preferably greater than 60 Hz.

Although FIG. 4 illustrates three groups of two LEDs, wherein the two LEDs within the group are in series, one of ordinary skill in the art will appreciate that other configurations are possible. The LEDs may be in parallel or in a series/parallel combination. The number of LEDs which may be placed in series is dependent on the forward voltage of the specific type of LED and the supply voltage. For example, if the circuit is powered from an automotive vehicle power supply, it is only possible to power two InGaN blue LEDs in series because the forward voltage of a InGaN LED is typically 3.5 volts each, plus 1.2 V for the current sink transistor for a total of 8.2 V (automotive design requirements mandate that a device be functional down to 9.0 V). For the same conditions, using an AlInGaP amber LED with a forward voltage of 2.5 V three series coupled LEDs, can be utilized.

Techniques other than pulse width modulation can be utilized to vary the brightness of LEDs 110. For example, a variable current source could be used to vary the DC current to the LEDs 110. Alternatively, the function of processor 401 may be replaced by a discrete logic circuit or an analog circuit.

Figure 5A:
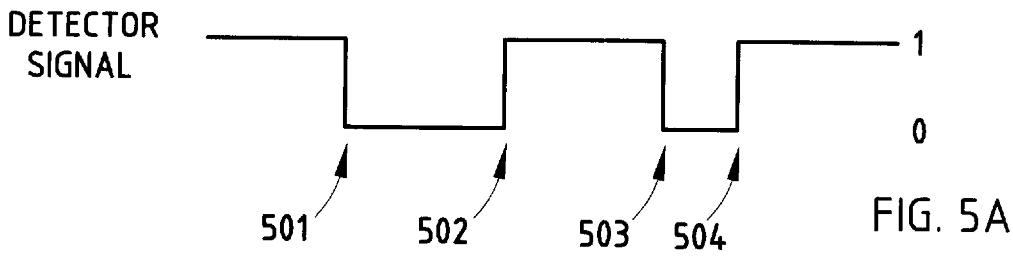
FIG. 5A is a diagram of a waveform for operating a detector, according to an embodiment of the present invention.

Detector 106 is connected to port 3 of processor 401. The operation of a photodiode light sensor, according to U.S. patent application Ser. No. 09/307,191, is described with reference to FIG. 5A. Detector 106 (FIG. 4) may be configured as an open-drain device with a high output produced by pull-up resistor R7. The rise time of edges 502 and 504 of a detector output signal 500 is thus determined by the RC time constant of R7 and C1. To acquire a light measurement, processor 401 sets port 3 low for predetermined time period. At the end of the time period, the processor 401 tri-states port 3 and the detector signal 500 is pulled high by resistor R7. The time period between falling edge 501 and rising edge 502 defines the integration period over which photon-generated charge is collected in detector 106. After a period of time, detector 106 generates an output pulse shown by the low pulse between edges 503 and 504. The time between edges 503 and 504 is indicative of the amount of charge collected over the integration period and thus the light level incident on detector 106.

As is described in greater detail in U.S. patent application Ser. No. 09/307,941, filed on May 7, 1999, entitled AUTOMATIC DIMMING MIRROR USING SEMICONDUCTOR LIGHT SENSOR WITH INTEGRAL CHARGE COLLECTION, by Stam et al., commonly assigned with the present invention, and hereby incorporated by reference, the time between the rising edge of the integration pulse 502 and the falling edge of the output pulse 503 (called the pre-pulse time), is indicative of the dark current generated in the device and thus may be used as a measure of the temperature of the detector. A measure of temperature can be used to reduce the brightness of the LEDs 110, or inhibit their operation during high temperatures in order to prevent damage to the lamps.

Figure 5B:
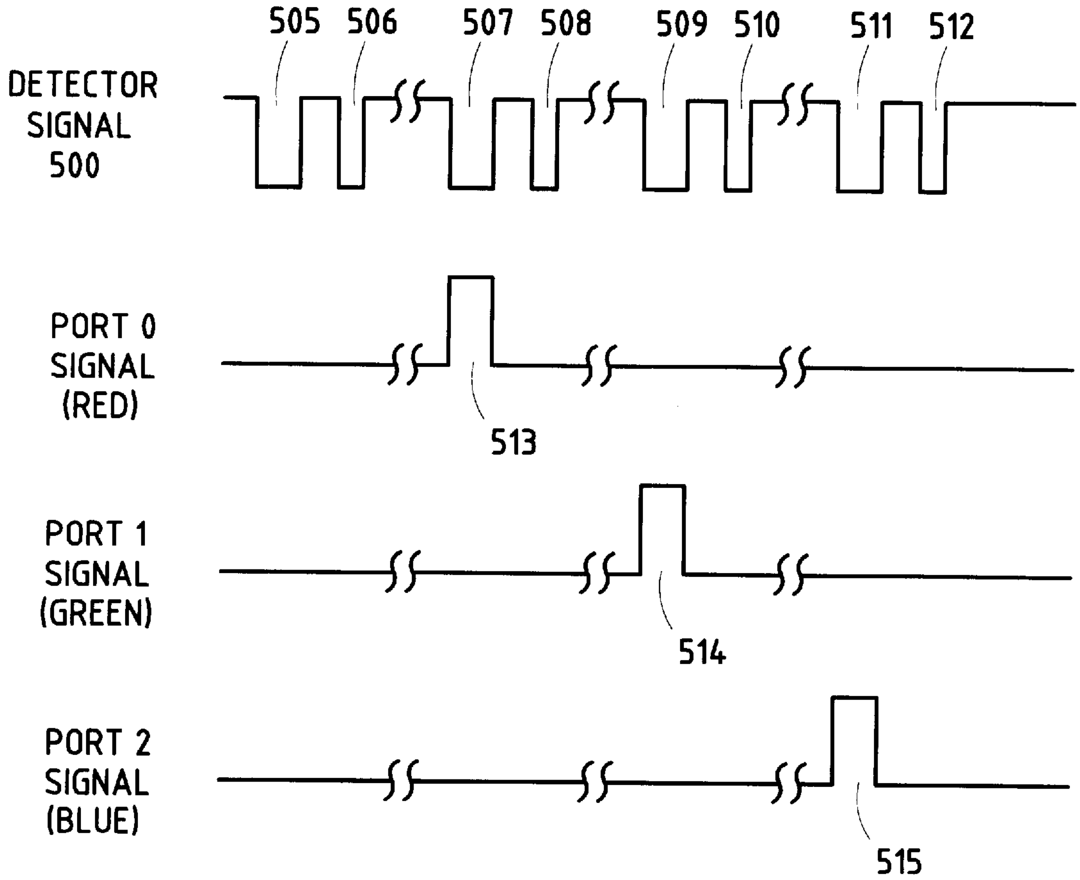
FIG. 5B is a diagram of four waveforms for operating a detector to measure the ambient light and intensity of LEDs, according to an embodiment of the present invention.

The use of the detector 106 to measure the output of the LEDs is further described with reference to FIG. 5B. Initially, detector 106 may acquire an ambient light reading which may then be subtracted from further readings of the LEDs 110 to prevent ambient light conditions from interfering with the brightness readings of the LEDs. Alternatively, the ambient light reading can be used as a control input for the illumination system. An ambient reading is taken with integration pulse 505 and received with output pulse 506. As mentioned above, the time between pulses can be used as a temperature measurement. Next, a measurement is taken of the output of one of the groups of LEDs, for example, the red group 101. The red group of LEDs 101 is turned on by setting port 0 of the processor 401 high as indicated by pulse 513. Pulse 513 occurs simultaneously with integration pulse 507 and output pulse 508 is indicative of the output of the red LEDs 101, optionally after subtracting the ambient light measurement. In a similar way, the green group of LEDs 102 is turned on with port 1, as indicated by pulse 514 which occurs with integration pulse 509. The brightness of green LEDs 102 is indicated by output pulse 510. Finally, blue LEDs 103 are turned on with port 2, as indicated by 515 during integration pulse 511 with the brightness indicated by the width of pulse 512.

If the lamp 100 is likely to be used in conditions where the ambient lighting is produced with fluorescent lamps or discharge lamps, it is desirable to take into account the 120 Hz oscillation which occurs in these lamps as a result of being powered from a 60 Hz AC line source. To insure that the ambient light level measurement is constant and that the amount of ambient light level present in a measurement of the LED brightness is consistent and can thus be accurately subtracted from LED brightness measurements, it is useful to use an integration pulse width of 1/120th of a second (0.0083 ms) or a multiple thereof. If shorter integration pulse widths are required, it is desirable to have the beginning of the ambient light integration pulse 505 and the beginning of any of the LED brightness measurement pulses 507, 509, or 511 separated by 1/120th of a second or a multiple thereof.

Figure 6:
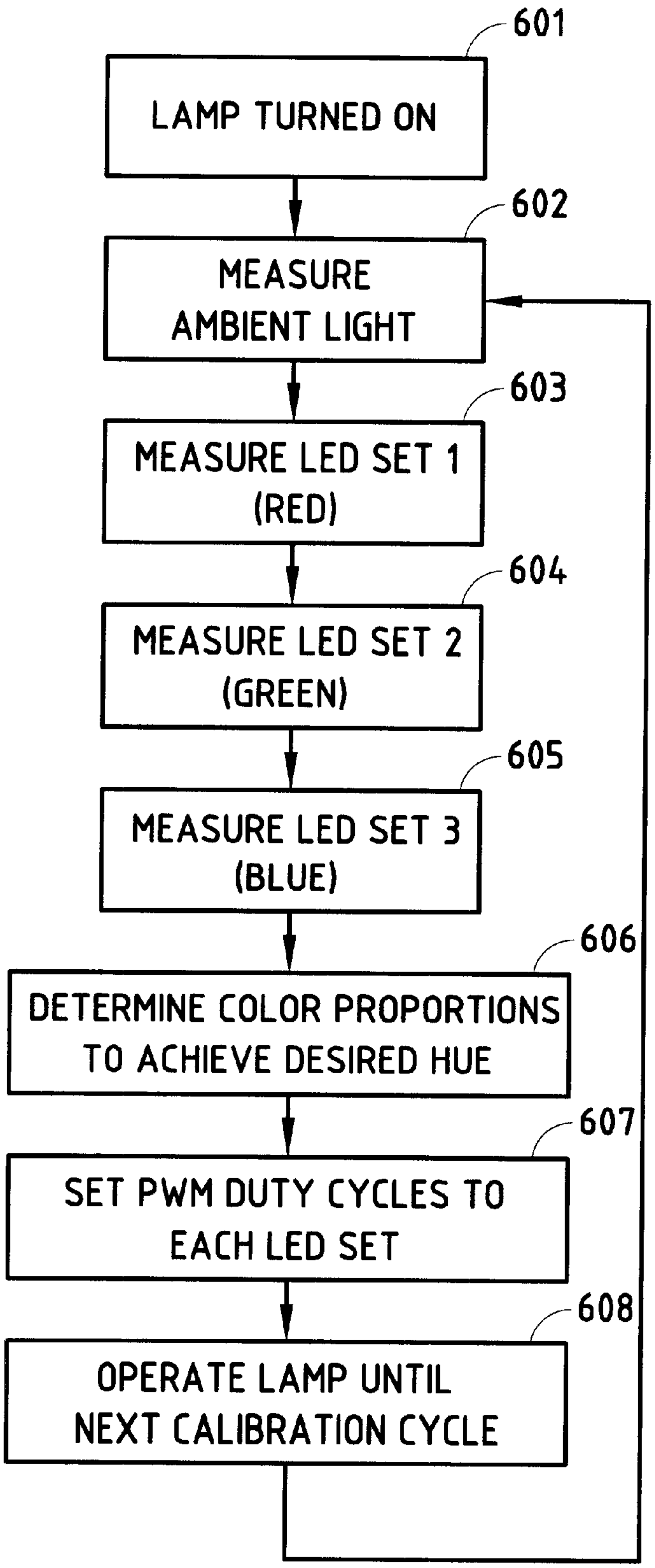
FIG. 6 is a flow chart showing the operation of the present invention.

The operation of an LED illuminator assembly 100, according to the present invention, is best described with reference to FIG. 6. After the lamp is turned on in step 601, an ambient light measurement is taken in step 602, according to the procedure described above. Next, brightness measurements of each of the LED sets are taken in steps 603, 604 and 605. If fewer groups of LEDs are present (such as would be the case in a binary-complementary white system) one or more of these steps are omitted. If more groups of LEDs are present, additional measurement steps can be added between steps 605 and 606.

Figure 7:
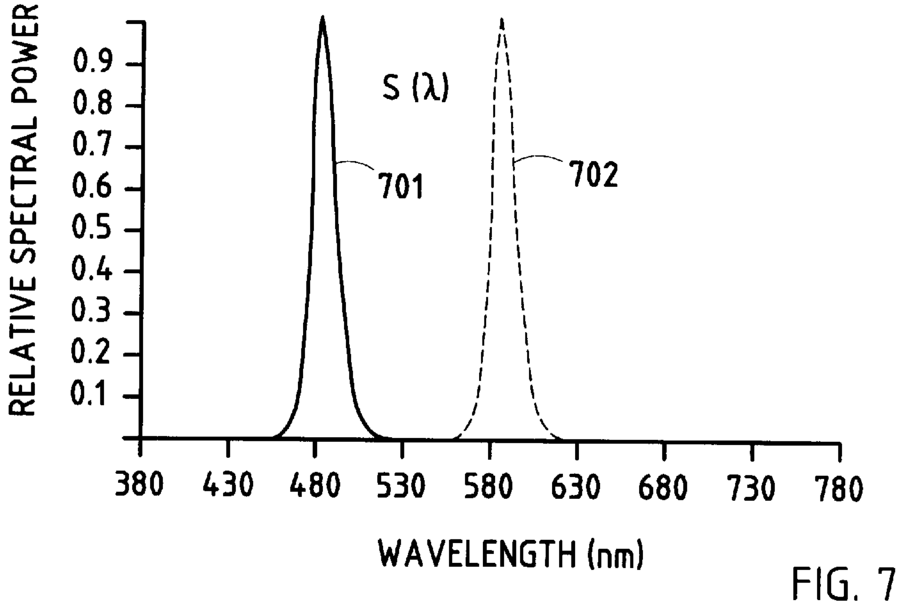
FIG. 7 is a plot of the relative spectral power vs. wavelength for LEDs which may be used to implement the present invention, according to an embodiment of the present invention.
Figure 8:
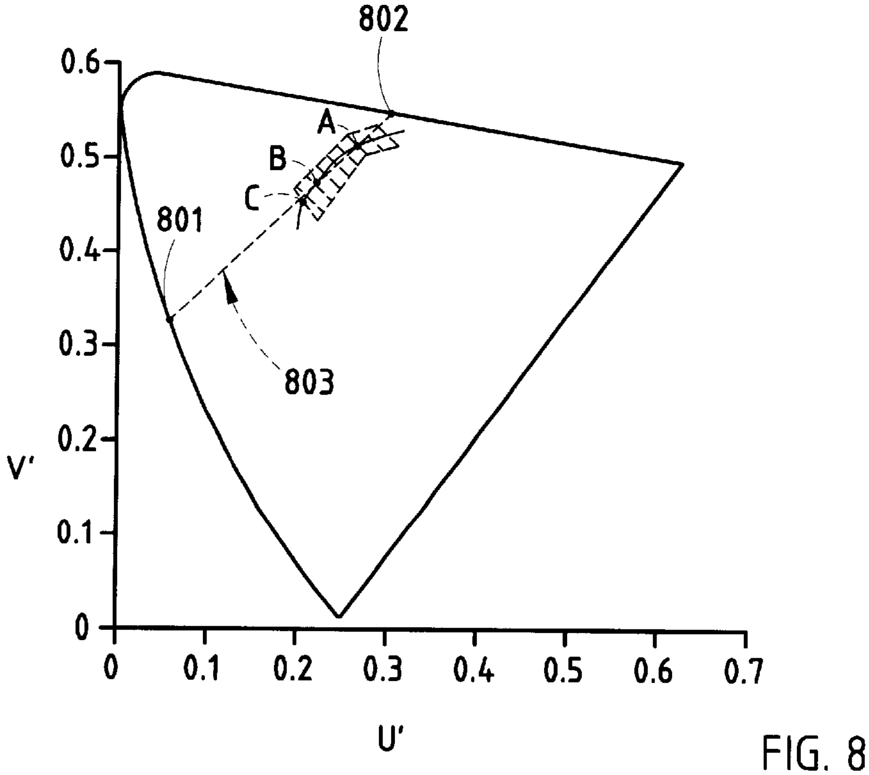
FIG. 8 is a CIE 1976 UCS diagram showing the formatting of white light by the mixing of two complementary hues from LEDs that may be used in the present invention.

Once brightness measurements for all of the constituent LED colors are acquired, a duty cycle required to achieve a desired illumination hue is determined. This process is best described with reference to FIGS. 7 and 8. For simplicity, a description of a binary-complementary two color system is described first. FIG. 7 illustrates the relative spectral output power of a blue-green InGaN LED 701 and an amber AlInGaP LED 702. As is readily evident from FIG. 7, both of these LEDs are highly monochromatic having the majority of their optical output power contained in a narrow range of wavelengths (i.e., peak of ~483 nm for Blue-Green and ~584 nm for Amber). Thus, these sources are highly saturated and can be approximated as a single point on the monochromatic locus of the CIE 1976 UCS diagram (FIG. 8).

Point 801 defines the color coordinates of the blue-green (483 nm) LED and point 802 defines the color coordinates of the amber (584 nm) LED. An additive mixture of light from these two LEDs can produce any hue with color coordinates along line 803, which extends between points 801 and 802. The proportion of light needed from each LED to achieve a hue along line 803 is inversely proportional to the distance between the color coordinate of the desired hue and the color coordinate of the LED. For example, CIE standard illuminant A may be synthesized with one proportioned combination of amber and blue-green LED light. CIE standard illuminate B can also be produced but with a combination which contains proportionally more blue-green light (or equivalently less amber light) than the combination to synthesize illuminate A.

Figure 9:
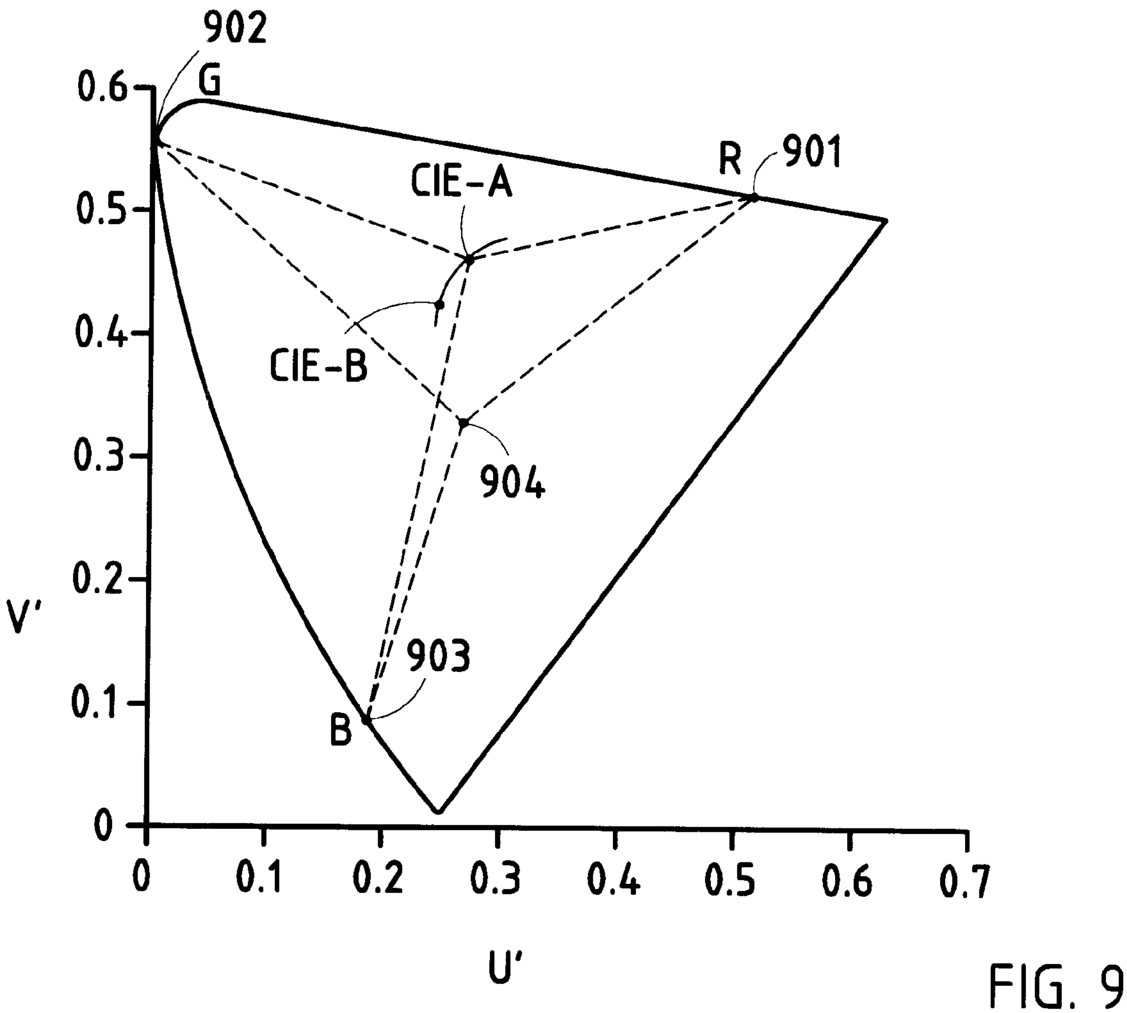
FIG. 9 is a CIE 1976 UCS diagram showing the formatting of any color light by the mixing of three hues from LEDs that may be used in the present invention.

A similar procedure can be used to determine the relative proportions of each color needed to achieve any color when using three colors of LEDs. Referring to FIG. 9, three groups of LEDs are used with colors red (630 nm), green (520 nm) and blue (450 nm). As above, the amount of light required from each LED is inversely proportional to the distance between the point representing the color coordinates or the desired hue and the point representing the location of the LED peak wavelength on the monochromatic locus. The points representing the LEDs are shown as 901, 902 and 903 for red, green and blue, respectively. In order to form a white light equivalent to CIE illuminant A, each LED group should be adjusted to a brightness inversely proportional to the distance between the point labeled CIE A and the respective LED color coordinates (these distances are indicated by dashed lines). Similarly, to achieve a purple hue, as represented by point 904, the brightness of each LED should be adjusted inversely proportional to the lines between point 904 and the LED coordinates represented by the dotted lines in FIG. 9.

One of ordinary skill in the art will appreciate that the procedure outlined above can readily be adapted to situations where more than three groups of LEDs are used or where groups of two or three colors other than the colors described may be used. Colors other than those mentioned may be employed, for example, if another color is more economically feasible to implement and the desired resultant hues can be achieved with those colors. The use of three or more colors can greatly improve color rendering. The present invention allows the use of two or more colors while managing the variance of the LED intensity with feedback and thus makes it practical to produce a precisely defined resultant hue.

Once the relative proportions are determined, the duty cycles for each of the constituent LED colors are determined. In order to compute the duty cycle, it is necessary to know the efficiency of the LED, the drive current to the LED and the efficiency of the optical system as it relates to each LED. With the use of a feedback detector, the complexity of these computations can be reduced. Using feedback, typically only the sensitivity of the detector for each of the LED peak wavelengths must be known. Aspects of the optical design, which may cause the detector to sense the LEDs of different colors with different efficiency, may also be considered. Once the spectral efficiency of the detector is determined (a parameter usually determined experimentally during the design of the illuminator assembly), the detector can simply measure the relative output of each LED group under different applied duty cycles. If the change in output of the LED is not a simple function of the change in duty cycle or applied current, detector 106 can be used to measure the output of an LED over several cycles at different duty cycles or at different drive currents. Thereafter, a control circuit will vary the duty cycle to achieve a proportional increase or decrease in the LED output necessary to achieve the desired resultant hue.

The duty cycles for each of the LED groups are set in step 607. These may be set as parameters to counter/timer peripherals capable of generating a PWM signal or as variables of a software routine that generates the PWM signals. If a drive mechanism other than PWM is used, appropriate parameters can be set at this time. After the PWM signals are set, the processor 401 generates the PWM waveforms for the pre-determined time period, in step 608, or until the next calibration cycle commences, at which point control proceeds again to step 602. The time period in 608 may be a consistent interval, such as once every few seconds, or a variable time period. A variable time period is useful to compensate for thermal decay, which occurs primarily during the first few minutes of operation. During the first few minutes, the calibration cycle may occur quite frequently, such as once every few seconds to several times a second. After the temperature has stabilized, the calibration cycle may occur much less often. Finally, the calibration cycle may only occur once when the lamp is initially turned on.

In order to properly implement the present invention, it may be advantageous to establish a calibration of the lamp during manufacture. This type of calibration is desirable if detector 106 exhibits substantial variance in sensitivity between detectors of a device family. Calibration of detector 106 can be obtained by illuminating detector 106 with a known reference light source and measuring output of the detector 106. A calibration constant may be stored in a programmable read-only memory, such as an EEPROM 402. EEPROM 402 may be a discrete component or be integrated with processor 401. Alternatively, calibration constants may be directly stored into a programmable ROM memory, accessible to processor 401. The sensitivity of detector 106 to different wavelengths is usually quite consistent relative to its overall sensitivity and thus, wavelength sensitivity (or quantum efficiency) calibration is typically not needed for every device (provided initial quantum efficiency measurements are made in a laboratory). However, detector 106 may be calibrated at the wavelengths for the colors of the LEDs used, if desired.

It may also be useful to obtain initial intensity and peak wavelength measurements for the illuminator assembly 100 during manufacture using a spectrometer or other detector. A suitable spectrometer that can be efficiently employed for this purpose, in a manufacturing environment, is available from Ocean Optics, Inc. The spectrometer may measure the initial intensity and wavelength and store calibration constants into the EEPROM 402. This is most useful when there is significant peak wavelength variance between the LEDs of a particular color. By knowing the exact peak wavelength, the processor 401 is able to make a more accurate determination of the duty cycles for each LED group to achieve a desired resultant hue.

In another embodiment, detector 106 may be used to sense the ambient lighting conditions and adjust the overall intensity or hue of the device according to a predetermined behavior. For example, during bright conditions, it may not be necessary to operate illuminator 100 at all. If the ambient light level is above a predetermined level, all LEDs 110 may be turned off. The intensity of the lamp may then be increased as the ambient level falls. In other applications, such as illuminating a sign with a prescribed hue, it may be useful to provide more light during high ambient conditions to maintain a prescribed contrast level. In this case, the intensity of the illuminator is set to a higher level with higher ambient conditions.

In certain applications, it may not be feasible to include detector 106 within the illuminator assembly 100, due to cost or size and packaging restrictions. In this case, it is possible to receive some of the advantages of the present invention using simulated feedback by considering the average decay of the LED lamps used in the illuminator. In this case, initial measurements of the intensity and optionally peak wavelength of the LEDs are made during manufacture. These values are then stored in a memory such as EEPROM 402. Known decay rates for each type of LEDs are used or measured experimentally during the design of the illuminator. These decay rates are then incorporated into the software of processor 401 and the duty cycles are adjusted accordingly to obtain the prescribed hue. Additionally decay rates for the overall life of the product may also be considered. Processor 401 can be programmed to record the number of hours the lamp has been operational since manufacture and vary the duty cycle of each LED group accordingly.

Finally, in other embodiments, it may be advantageous to eliminate processor 401. In these embodiments, an initial measurement of the LED intensity or color may be taken during manufacture. Calibration may be achieved by selectively varying a discrete component, which thus varies the intensity of one or more colors of LEDs. For example, a resistor in series with one or more LEDs may serve to regulate the current through these LEDs and thus vary their intensity. The value of this resistor may be changed to achieve calibration. In one embodiment, a variable resistor is used and its resistance is set during calibration. In another embodiment, the resistor could be populated in a printed circuit board after the LEDs have been measured. The value of this resistor would be set to achieve the desired calibration. Alternatively, a resistor or resistive ink could be laser trimmed to a desired value. Finally, a matrix of resistors could be combined in various parallel and serial combinations to achieve a desired value. The way in which the resistors are combined may be varied by selectively placing jumpers into the circuit or selectively ablating traces on the circuit board using a laser or other oblation means.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An illuminator assembly that produces light of a desired resultant hue, comprising:

a processor;

a memory for storing data and information coupled to the processor;

a plurality of light sources, wherein each of the light sources produces a different color, and wherein the processor is capable of individually controlling the optical radiation of each light source so as to produce a desired resultant hue; and a detector coupled to the processor, wherein the detector is positioned such that the optical radiation of each light source is individually measurable and said detector provides the processor with information which the processor utilizes in determining how to individually adjust the optical radiation of each of the light sources.

2. The illuminator assembly of claim 1, further including:

a diffuser positioned for diffusing light from the light sources, the diffuser further reflecting a portion of the light to the detector.

3. The illuminator assembly of claim 1, wherein the detector includes a silicon photodiode.

4. The illuminator assembly of claim 1, wherein the detector includes a CdS photoresistor.

5. The illuminator assembly of claim 1, wherein the plurality of light sources includes a red LED, a green LED and a blue LED.

6. The illuminator assembly of claim 1, further including:

a plurality of light source drivers, wherein each of the light source drivers are coupled between a different output of the processor and one of the light sources.

7. The illuminator assembly of claim 1, wherein the detector provides an ambient light level measurement which the processor utilizes in determining how to adjust an optical radiation of the plurality of light sources.

8. A method that allows a wide range of light sources of varying intensity and color to produce a desired resultant hue, comprising the steps of:

providing a plurality of light sources, wherein each of the light sources produces light of a different color;

determining the optical radiation of the light from each of the light sources; and controlling the optical radiation of each of the light sources.

9. The method of claim 8, further including the step of:

diffusing the light from the light sources.

10. The method of claim 8, wherein the optical radiation of the light from each of the light sources is determined by a detector that includes a silicon photodiode.

11. The method of claim 8, wherein the optical radiation of the light from each of the light sources are determined by a detector that includes a CdS photoresistor.

12. The method of claim 8, wherein the plurality of light sources includes a red LED, a green LED and a blue LED.

13. An automotive illuminator assembly that allows a wide range of light sources with varying intensity and color to produce a desired resultant hue, comprising:

a control circuit;

a plurality of light sources, wherein each of the light sources produces a different color, and wherein the control circuit is capable of individually controlling the optical radiation of each light source so as to produce a desired resultant hue; and A detector coupled to the control circuit, wherein the detector is positioned such that the optical radiation of each light source is individually measurable and said detector provides the control circuit with information which the control circuit utilizes in determining how the optical radiation of each light source should be individually adjusted.

14. The illuminator assembly of claim 13, further including:

a diffuser positioned for diffusing light from the light sources, the diffuser further reflecting a portion of the light to the detector.

15. The illuminator assembly of claim 13, wherein the detector includes a silicon photodiode.

16. The illuminator assembly of claim 13, wherein the detector includes a CdS photoresistor.

17. The illuminator assembly of claim 13, wherein the plurality of light sources includes a red LED, a green LED and a blue LED.

18. The illuminator assembly of claim 13, further including:

a plurality of light source drivers, wherein each of the light source drivers are coupled between a different output of the control circuit and one of the light sources.

19. The illuminator assembly of claim 13, wherein the detector provides an ambient light level measurement which the control circuit utilizes in determining how to adjust an optical radiation of the plurality of light sources.

* * * * *